United States Patent
Thumm et al.

(10) Patent No.: US 9,464,668 B2
(45) Date of Patent: Oct. 11, 2016

(54) BEARING SYSTEM

(71) Applicants: Gerhard Thumm, Erbach (DE); Till Merkel, Neu-Ulm (DE); Volker Voggeser, Senden (DE); Christian Lehnert, Ulm (DE)

(72) Inventors: Gerhard Thumm, Erbach (DE); Till Merkel, Neu-Ulm (DE); Volker Voggeser, Senden (DE); Christian Lehnert, Ulm (DE)

(73) Assignee: WIELAND-WERKE AG, Ulm (DE)

( * ) Notice: Subject to any disclaimer, the term of this patent is extended or adjusted under 35 U.S.C. 154(b) by 340 days.

(21) Appl. No.: 14/195,317

(22) Filed: Mar. 3, 2014

(65) Prior Publication Data

US 2014/0254964 A1 Sep. 11, 2014

(30) Foreign Application Priority Data

Mar. 9, 2013 (DE) .......................... 10 2013 004 151
Mar. 9, 2013 (DE) .................... 20 2013 002 328 U

(51) Int. Cl.
*F16C 33/04* (2006.01)
*F16C 33/02* (2006.01)
*F16C 33/62* (2006.01)
*F16C 33/58* (2006.01)

(52) U.S. Cl.
CPC .............. *F16C 33/62* (2013.01); *F16C 33/043* (2013.01); *F16C 2206/42* (2013.01); *F16C 2231/00* (2013.01)

(58) Field of Classification Search
CPC ....... F16C 33/201; F16C 25/02; F16C 33/62

USPC .................. 508/100–109; 384/276, 492, 569
See application file for complete search history.

(56) References Cited

U.S. PATENT DOCUMENTS

| 4,828,728 A | 5/1989 | Dimigen et al. |
| 6,499,881 B2 | 12/2002 | Boutaghou et al. |
| 2002/0035026 A1* | 3/2002 | Greil ....................... C04B 35/14 501/88 |

FOREIGN PATENT DOCUMENTS

| DE | 29 26 080 A1 | 1/1981 |
| DE | 36 40 430 A1 | 6/1987 |
| DE | 100 18 688 A1 | 8/2001 |
| DE | 10 2004 018 921 A1 | 11/2005 |
| DE | 10 2005 043 217 A1 | 3/2007 |
| DE | 10 2006 015 888 A1 | 10/2007 |
| DE | 10 2008 025 681 A1 | 12/2009 |
| EP | 0 195 205 A2 | 9/1986 |
| JP | 6-228724 A | 8/1994 |
| JP | 8-53749 A | 2/1996 |
| WO | WO 96/04485 A1 | 2/1996 |

OTHER PUBLICATIONS

European Search Report dated Nov. 18, 2014 (5 pages).

* cited by examiner

*Primary Examiner* — Vishal Vasisth
(74) *Attorney, Agent, or Firm* — Flynn, Thiel, Boutell & Tanis, P.C.

(57) ABSTRACT

A bearing system having a bearing pair made up of at least one bearing and at least one running partner, wherein a coating which is made up of a layer of which the main constituent is amorphous $SiO_2$ is applied to at least one running surface of the bearing pair.

7 Claims, No Drawings

BEARING SYSTEM

FIELD OF THE INVENTION

The invention relates to a bearing system having a bearing pair made up of a bearing and a running partner, wherein a coating for improving the bearing properties is applied to at least one running surface of the bearing pair.

It is known that running surfaces of bearing pairs are coated in order to improve the bearing properties. In particular, coatings serve as run-in layers, the run-in layer compensating for dimensional tolerances on the components of the bearing. In bearings of internal combustion engines, use is made of hard material layers made of diamond-like carbon (DLC layers), as described for example in documents WO 96/04485, DE 10 2004 018 921 A1, DE 10 2005 043 217 A1, DE 10 2006 015 888 A1 and DE 10 2008 025 681 A1. However, DLC layers are very hard and tend toward non-uniform application. On the top bearing of a connection rod, for example, this has the effect that the piston pin runs into the bearing bushing, leading to increased wear and an increase in the bearing play. Furthermore, DLC layers are expensive.

Layers made of silicon dioxide ($SiO_2$) are also used in bearing systems. In some cases, they serve as an intermediate layer or as an adhesion promoter layer, as described for example in documents DE 29 26 080 A1, U.S. Pat. No. 6,499,881 B2 and DE 100 18 688 A1. Castors in electroplating baths are provided with surface layers which contain $SiO_2$ and have layer thicknesses of several micrometers. JP 08053749 A and JP 06228724 propose applying layers of this type by thermal spraying. Layers of such thickness are not suitable for bearing systems in which a high accuracy of fit of the bearing partners is required.

The invention is based on the object of specifying improved bearing systems. In particular, the run-in behavior of the bearing system is to be improved by the suitable coating on at least one running surface. The coating is intended to be suitable for bearing systems with a high accuracy of fit.

With respect to a bearing system, the invention is portrayed by the claimed features and advantageous embodiments and developments of the invention.

The invention encompasses bearing systems having a bearing pair made up of at least one bearing and at least one running partner. According to the invention, a coating which comprises a layer of which the main constituent is amorphous $SiO_2$ is applied to at least one running surface of the bearing pair.

The invention in this respect proceeds from the consideration of coating running surfaces of bearing pairs with a layer of which the main constituent is amorphous $SiO_2$, in order to improve the bearing properties. The term "main constituent" means, in this context, that the layer consists of amorphous $SiO_2$ to an extent of more than 50% by weight, preferably to an extent of at least 80% by weight. Within the context of this invention, "amorphous $SiO_2$" is understood to mean $SiO_2$ structures which are built up from monomer molecules or small oligomers, which are formed by suitable precursors and react to form the structure, but not amorphous $SiO_2$ structures which are represented by way of a molten state, for example from melt flow or by thermal spraying.

On account of their properties, amorphous $SiO_2$ layers are better suited to use on running surfaces of bearing pairs than crystalline $SiO_2$ layers. Owing to the lack of long-range order of the atoms, amorphous $SiO_2$ layers are more elastic than crystalline $SiO_2$ layers, are less brittle and tend less to spall from the substrate. During the formation of an amorphous $SiO_2$ layer according to the invention, the layer is built up on the substrate in that individual reactive monomer molecules or small oligomers, which are formed by suitable precursors, uniformly accumulate locally, but extensively. The adhesion between the $SiO_2$ structures close to the substrate and the substrate is greater than the cohesion within the overlying $SiO_2$ structures. In bearing systems, amorphous $SiO_2$ layers are preferably applied to metallic substrates.

The bearing system according to the invention can be configured both as a plain bearing and as a rolling bearing. The advantages of the amorphous $SiO_2$ layer come into effect particularly in the case of plain bearings.

In a preferred configuration of the invention, the layer can consist of amorphous $SiO_2$ to an extent of at least 90% by weight. The layer may contain impurities, which are unavoidable on account of the coating process. These include organic residues from the precursors and also hydrogen atoms and OH groups.

In a preferred configuration of the invention, the layer of amorphous $SiO_2$ can be applied as a surface layer. In a layer system consisting of a plurality of different layers on the substrate, the surface layer denotes the functional layer which is furthest away from the substrate. It therefore represents the topmost functional layer and is thus the layer which interacts directly or indirectly in tribological terms with the other partner of the bearing pair. The high elasticity of the layer of amorphous $SiO_2$ makes it possible to ideally compensate for instances of unevenness on the running surfaces of the bearing pair. The invention also encompasses embodiments in which a further, non-functional top layer is applied to the layer of amorphous $SiO_2$. In particular, this includes top layers which, on account of their small thickness, give reason to expect no or only insignificant functionality. This is to be assumed in particular for top layers having a thickness of less than 10 nm.

In the bearing system according to the invention, the layer of amorphous $SiO_2$ can advantageously be a run-in layer. A run-in layer serves to compensate for manufacturing-related geometrical deviations of the bearing and/or of the running partner. For this purpose, the run-in layer can be at least partially removed during the run-in process. In an amorphous $SiO_2$ layer, the adhesion between the $SiO_2$ structures close to the substrate and the substrate is greater than the cohesion within the overlying $SiO_2$ structures. This property is essential for use as a run-in layer, since extremely small elements of the coating can be removed without the layer being removed extensively. Furthermore, the elements of the layer which are removed are elastic and not hard. They do not have a negative effect on the running properties of the bearing pair, even if they remain between the running surfaces. The advantages of the amorphous $SiO_2$ layer as a run-in layer come into effect particularly in the case of sliding surfaces of plain bearings.

In a preferred configuration of the invention, the layer of amorphous $SiO_2$ can have a thickness of at least 10 nm and at most 500 nm. A thickness of less than 10 nm is not sufficient for realizing the advantageous properties of the layer. In the case of layer thicknesses above 500 nm, the layer tends toward embrittlement. In a particularly preferred configuration of the invention, the layer of amorphous $SiO_2$ can have a thickness of at least 100 nm and at most 300 nm. In the case of a layer thickness of at least 100 nm, the advantages of the amorphous $SiO_2$ layer come into full effect. On the other hand, the coating time and consequently the process costs rise with an increasing layer thickness. An upper limit of 300 nm proves to be economical. In addition, it may be advantageous to limit the thickness of the layer to at most 250 nm, since it then does not have to be taken into consideration in the dimensions of the components to be coated when they are being produced.

In a preferred configuration of the invention, the thickness of the layer of amorphous $SiO_2$ can deviate from the mean thickness of the layer by not more than +/−10% over 90% of the coated surface. Amorphous $SiO_2$ layers are distinguished by a very uniform layer thickness. Local fluctuations in the layer thickness, for example elevations at edges of the components, arise only to an insignificant extent. Consequently, fluctuations in the layer thickness of this type do not need to be taken into consideration in the manufacturing tolerances of the component to be coated. The coated components can be mounted without any problems. They are distinguished by a uniform run-in behavior and a uniform tribological behavior.

Advantageously, the layer of amorphous $SiO_2$ can furthermore contain organic residues. In addition to organic residues from the precursors, these also include functional additions, which can influence the surface energy and therefore the wetting properties of the system. The wetting of the running surfaces by lubricant is important in this context.

Advantageously, the layer of amorphous $SiO_2$ can furthermore contain further ceramic oxides. Ceramic oxides, for example $Al_2O_3$, $ZrO_2$ and $TiO_2$, can contribute to the modification of the layer hardness. In this way, it is possible to adapt the properties of the layer of amorphous $SiO_2$ depending on the exact requirements of the particular application.

The invention will be explained in more detail on the basis of the exemplary embodiment below.

The surface of a piston pin made of steel was coated with a 300 nm thick layer of amorphous $SiO_2$. The coated piston pin was installed in an internal combustion engine as a connection between a connection rod and a piston. A plain bearing made of a copper alloy was installed in the connection rod eye. The engine was subjected to a run-in test on a test stand for internal combustion engines. The comparative object used was an engine in which the piston pin was coated with DLC (hard material layer made of diamond-like carbon). The bearing system coated with amorphous $SiO_2$ exhibits considerably less wear under visual and electron-optical examination after the test.

Furthermore, the increase in the bearing play in the case of the pin coated with amorphous $SiO_2$ was scarcely measurable, whereas the bearing play in the case of the pin coated with DLC had approximately doubled

The invention claimed is:

1. A bearing system having a bearing pair made up of at least one bearing and at least one running partner, wherein a coating is applied to at least one running surface of the bearing pair, characterized in that the coating comprises a run-in surface layer of which the main constituent is amorphous $SiO_2$.

2. The bearing system according to claim 1, characterized in that the run-in surface layer consists of amorphous $SiO_2$ to an extent of at least 90% by weight.

3. The bearing system according to claim 1, characterized in that the run-in surface layer of amorphous $SiO_2$ has a thickness of at least 10 nm and at most 500 nm.

4. The bearing system according to claim 3, characterized in that the run-in surface layer of amorphous $SiO_2$ has a thickness of at least 100 nm and at most 300 nm.

5. The bearing system according to claim 1, characterized in that the thickness of the run-in surface layer of amorphous $SiO_2$ deviates from the mean thickness of the run-in surface layer by not more than +/−10% over 90% of the coated surface.

6. The bearing system according to claim 1, characterized in that the run-in surface layer of amorphous $SiO_2$ also contains organic residues.

7. The bearing system according to claim 1, characterized in that the run-in surface layer of amorphous $SiO_2$ also contains ceramic oxides.

* * * * *